(12) United States Patent
Vaknin et al.

(10) Patent No.: US 11,842,074 B2
(45) Date of Patent: Dec. 12, 2023

(54) STRIPING IN A STORAGE SYSTEM

(71) Applicant: Vast Data Ltd., Tel Aviv (IL)

(72) Inventors: Yogev Vaknin, Tel Aviv (IL); Eli Malul, Tel Aviv (IL); Lior Klipper, Tel Aviv (IL); Renen Hallak, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/207,721

(22) Filed: Mar. 21, 2021

(65) Prior Publication Data

US 2022/0300201 A1    Sep. 22, 2022

(51) Int. Cl.
*G06F 3/06* (2006.01)

(52) U.S. Cl.
CPC .......... *G06F 3/0659* (2013.01); *G06F 3/0613* (2013.01); *G06F 3/0619* (2013.01); *G06F 3/0631* (2013.01); *G06F 3/0635* (2013.01); *G06F 3/0689* (2013.01); *G06F 2211/1004* (2013.01)

(58) Field of Classification Search
CPC .... G06F 3/0659; G06F 3/0613; G06F 3/0619; G06F 3/0631; G06F 3/0635; G06F 3/0689; G06F 2211/1004
See application file for complete search history.

(56) References Cited

U.S. PATENT DOCUMENTS

| | | | | |
|---|---|---|---|---|
| 6,055,354 | A * | 4/2000 | Bopardikar | ............ G06F 3/0613 |
| 2002/0095532 | A1 * | 7/2002 | Surugucchi | ............ G06F 3/0689 710/5 |
| 2010/0306468 | A1 * | 12/2010 | Shionoya | ............ G06F 11/1076 711/114 |
| 2020/0117386 | A1 * | 4/2020 | Dong | ............ G06F 3/0608 |

OTHER PUBLICATIONS

Class notes for CSCI.4210 Operating Systems Fall, 2009 Class 14 on Input/Output Systems ) captured from archive.org on 20190618144207 attached to this office action and available online at http://www.cs.rpi.edu/academics/courses/fall09/os/c14/ (Year: 2019).*
1995 ACM Sigmetrics Conference article titled 'Striping in a RAID Level 5 Disk Array, by Peter M. Chen and Edward K Lee) available online at https://dl.acm.org/doi/abs/10.1145/223587.223603 (Year: 1995).*

* cited by examiner

*Primary Examiner* — Michael Krofcheck
*Assistant Examiner* — Janice M. Girouard
(74) *Attorney, Agent, or Firm* — Reches Patents

(57) ABSTRACT

A method for striping, the method may include performing, for each period of time out of multiple periods of time, the steps of: (i) determining striping rules; wherein the determining of the striping rules may include selecting one or more selected stripe size values out of multiple stripe size value candidates; wherein the selecting is based on values of storage system parameters that are obtained when applying the multiple stripe size value candidates; wherein the storage system parameters comprise storage space utilization and storage system throughput; and (ii) applying the striping rules by the storage system, during the period of time; wherein the applying comprises obtaining data chunks; converting the data chunks to stripes having at least one of the one or more selected stripe size values; and storing the stripes in the storage system.

17 Claims, 9 Drawing Sheets

FIG. 1B

Stripe size=4
waste=0
parities=14
Total waste=14

| | | | | | | | | |
|---|---|---|---|---|---|---|---|---|
| 101(1) | 1 | 2 | 4 | 6 | | | | |
| 101(2) | 1 | 3 | 4 | 6 | | | | |
| 101(3) | 1 | 3 | 5 | 6 | | | | |
| 101(4) | 1 | 3 | 5 | 7 | 8 | | | |
| 101(5) | 1 | 3 | 5 | 7 | 9 | | | |
| 101(6) | 2 | 3 | 5 | 7 | 8 | 9 | | |
| 101(7) | 2 | 4 | 5 | 7 | 8 | 9 | | |
| 101(8) | 2 | 4 | 6 | 7 | 8 | 9 | | |
| 101(9) | 2 | 4 | 6 | 8 | 9 | | | |

Stripe size=5
waste=11
parities=9
Total waste=20

Stripe size=6
waste=8
parities=8
Total waste=16

Calculating space utilization and write throughput of a storage system, for multiple values of stripe sizes, where each iteration is executed for one stripe size. 210

Determining the parity size based on the stripe size. 215

Simulating assignment of disk's chunks to stripes according to the stripe size. 220 evaluating different chunk-to-stripe assignments for determining the assignment that allows a maximum number of parallel stripe writes. 222

Performing the assignment by using a weighted round robin scheme, according to the disk sizes. 223

Calculating space utilization and write throughput when using the stripe size and the assignment that allows a maximum number of parallel stripe writes. 230

Defining striping rules by selecting at least one stripe size according to space utilization and write throughput preferences. 240

Defining a set of striping rules per each group of disks with a similar write throughput. 241

Writing stripes according to the striping rules that includes one or more stripe sizes and the number of stripes to be written in parallel. The writing of stripes may be further according to one or more rules: the type of disks to be used in each stripe, the assignment of disks per each stripe, the grouping of stripes to be written in parallel. 250

STRIPING IN A STORAGE SYSTEM

TECHNICAL FIELD

The present disclosure generally relates to the field of data storage, and more particularly to striping in a storage system.

BACKGROUND

A storage system may include multiple compute nodes and multiple storage nodes. Non-limiting examples of compute nodes and storage nodes are illustrated in US patent application 2019/0141128 which is incorporated herein by reference.

Striping of data is used by Redundant Array of Inexpensive Disks (RAID) and erasure coding mechanism of storage systems. A stripe is a set of data that is protected by a RAID or an erasure coding implementation. The stripe is divided into k data chunks and protected by m parity chunks, where each of the chunks (data or parity chunks) is stored in a different storage device (e.g., disk).

The number of parity chunks dictates the number of drives that can fail concurrently, without losing data, where the lost chunks can still be repaired by using chunks that are stored in non-failed drives.

There is a growing need to provide a method that may perform efficient striping.

SUMMARY

There may be provide a storage system, a method and a non-transitory computer readable medium for hierarchical workload allocation in a storage system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 1B illustrates an example of disks and chunks for a second stripe size;
FIG. 1C illustrates an example of disks and chunks for a third stripe size;
FIG. 1D illustrates an example of disks and chunks for a fourth stripe size;
FIG. 3A illustrates an example of a method.

DETAILED DESCRIPTION

Figure 1A:
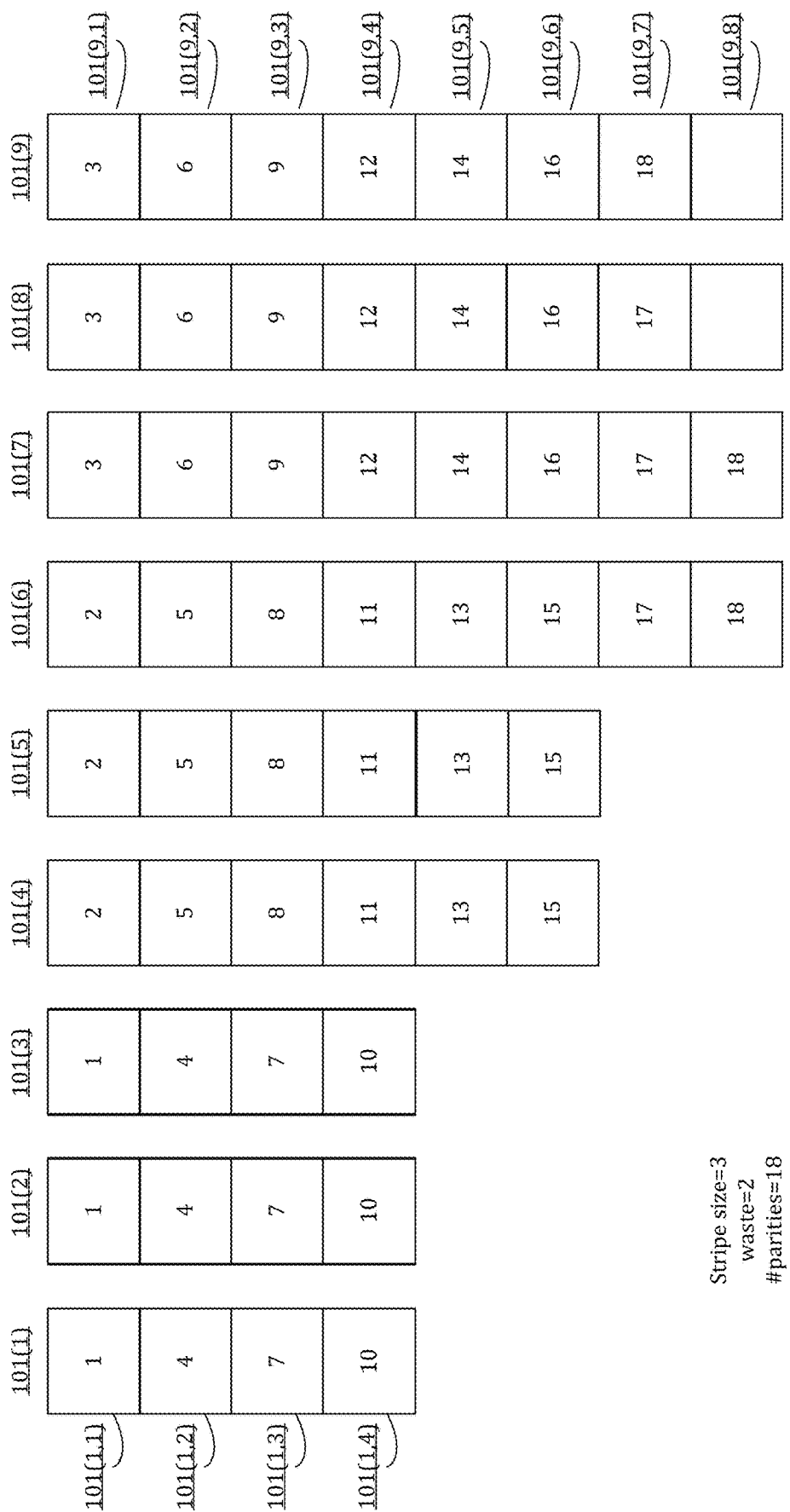
FIG. 1A illustrates an example of disks and chunks for a first stripe size.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided a storage system, a method and a non-transitory computer readable medium for striping in a storage system.

The storage system and method of the present invention determine striping rules of the storage system, that will be used for striping and for writing the stripes. A stripe is a set of data chunks that is protected by an erasure coding mechanism.

The striping rules aim to optimize the storage space utilization, and the write throughput of the storage system. The striping rules may dictate one or more stripe sizes to be used for writing, the involved disk types, and the number of concurrent stripe writes.

The storage system includes multiple disks (e.g., SSDs) of different sizes and different types. The disk type refers to the disk performance, mainly in terms of write throughput (the amount of data that can be written per time unit). The multiple disks may span across multiple storage nodes and multiple storage boxes.

The term disk refers to any storage drive, such as SSD (Solid State Drive), HDD (Hard Disk Drive), or any other device that can be used for storing large amounts of data.

The maximum throughput of the system is potentially achieved when all the disks are written to simultaneously. However, when implementing striping for writing data, and particularly when using very large stripes that counts tens or hundreds of data chunks, the actual throughput may be lower than the maximum throughput, and may be limited to the number of chunks that can be written simultaneously, when being written as part of the stripes.

In addition, since a stripe cannot include more than one chunk from a single disk, and since the disks are of different sizes, then—various sizes of stripes may lead to various amounts of unused disk space that cannot be allocated to stripes.

According to embodiments of the invention, stripe allocation rules are determined to achieve an optimal space utilization and/or an optimal performance, mainly throughput (e.g., the amount of data that can be written in a second), or any combination of optimal performance and space utilization. Preferences of performance and space utilization may define a combination of performance and space utilization that can assumes performance priority or space utilization priority, for example: selecting the configuration that results a minimal space waste among all configurations with the highest performance, or select the configuration with highest performance among all configurations that result the lowest space waste. The preferences may include thresholds of a minimal desired write throughput or a minimal desired space utilization.

The optimal space utilization (or lowest space waste) refers to a situation where a minimal amount of disk space is not used for user data. Disk space that is not used for user data includes: the amount of space reserved for parity data, and unused disk space that cannot be used due to remainder chunks that cannot be assigned to stripes in the chosen striping mode. Unused disk space occurs when different sizes of disks are used, and certain number of disks are allocated per stripe. Different combinations of disks sizes that are further combined with different stripe sizes can produce different amounts of unused space. In addition, sizes of stripes dictate the number of stripes stored in the system, which in turn, dictates the number of storage space allocated to parities.

The stripe rules include: determining the size of the stripes, i.e., how many disks (or chunks of disks) are assigned to each stripe, and the amount of stripes that can be written in parallel, based on the current installation of disks in the storage system.

The current installation of disks includes: the number of available disks (operational disks), the sizes of different disks, and the performance parameters of each disk, e.g., the throughput of each disk. The size of the disks may refer to an available capacity of the disk, i.e., if certain areas of the disk are marked as failed, the size of the disk that is available for striping is lower than the size of a fully operational disk. The available capacity of the disk may further refer to the capacity that is free for storing new stripes.

The algorithm for determining the striping rules is executed periodically, or when a change in the disks occurs, e.g.: the number and/or types of disks is changed due to adding new disks, due to removal of disks or due to disk failures.

The algorithm for determining the striping rules may run a simulation for assigning disk chunks to stripes, that includes multiple iterations, and upon each iteration: (i) selecting a stripe size out of multiple stripe sizes, (ii) calculating space utilization, (iii) evaluating different disk-to-stripe assignments for determining the maximum number of parallel stripe writes, and (iv) calculate the throughput when using stripes of the assumed stripe's size and the maximum number of parallel stripe writes.

After performing the multiple iterations for the various stripe sizes, the calculated sets of space utilization and throughput is examined, and the preferred stripe size is selected according to a determined preference of performance and space utilization.

FIGS. 1A-1D illustrates various stripe sizes across multiple disks, as assumed during various iterations of the simulation. For the sake of simplicity, only 9 disks are illustrated, each having 4-8 chunks, and 3-6 chunks are assumed per stripe. However, it is noted, that the number of disks in the storage system can exceed tens, hundreds, thousands, or tens of thousands of disks, the number of chunks in each disk can reach hundreds or thousands or even more chunks, the number of chunks per stripe can vary between several tens to several hundreds. Further for the sake of simplicity, the example assumes one chunk of parity per stripe, however, the number of parities may exceed one, for example, 4 parities may be assigned per stripe, with variable numbers of parities assigned for variable numbers of disks participating in each stripe.

FIG. 1A illustrates 9 disks 101(1)-101(9) of different sizes. Disks 101(1)-101(3) includes 4 chunks each, for example, disk 101(1) includes chunks 101(1,1)-101(1,4). Disks 101(4)-101(5) include 6 chunks each, and disks 101(6)-101(9) includes 8 chunks each, for example, disk 101(9) includes chunks 101(9,1)-101(9,8).

In order to evaluate the impact of a certain number of chunks per stripe, the simulation selects upon each iteration, a certain number of chunks per stripe, out of a series of sizes to be evaluated.

FIG. 1A illustrates an evaluation of a three-chunk stripe. The first stripe includes the first three chunks of disks 101(1)-101(3), and illustrated as a rectangle containing the number '1'. The second stripe includes the first three chunks of disks 101(4)-101(6), and illustrated as a rectangle containing the number '2'. The 18th stripe includes chunk 101(9, 7) of disk 101(9), the last chunk of disk 101(6) and the last chunk of disk 101(7), all illustrated as a rectangle containing the number '18'. It is assumed that each of the eighteen stripes include one chunk of parity.

FIG. 1A illustrates that two chunks (the last two chunks of disks 101(8)-101(9)) are wasted since these chunks are not allocated to any stripe. Since there are eighteen stripes each with one parity chunk, then eighteen chunks are allocated to parities. Therefore, the total number of chunks that are not used for user data is 20 (18+2).

Figure 1B:
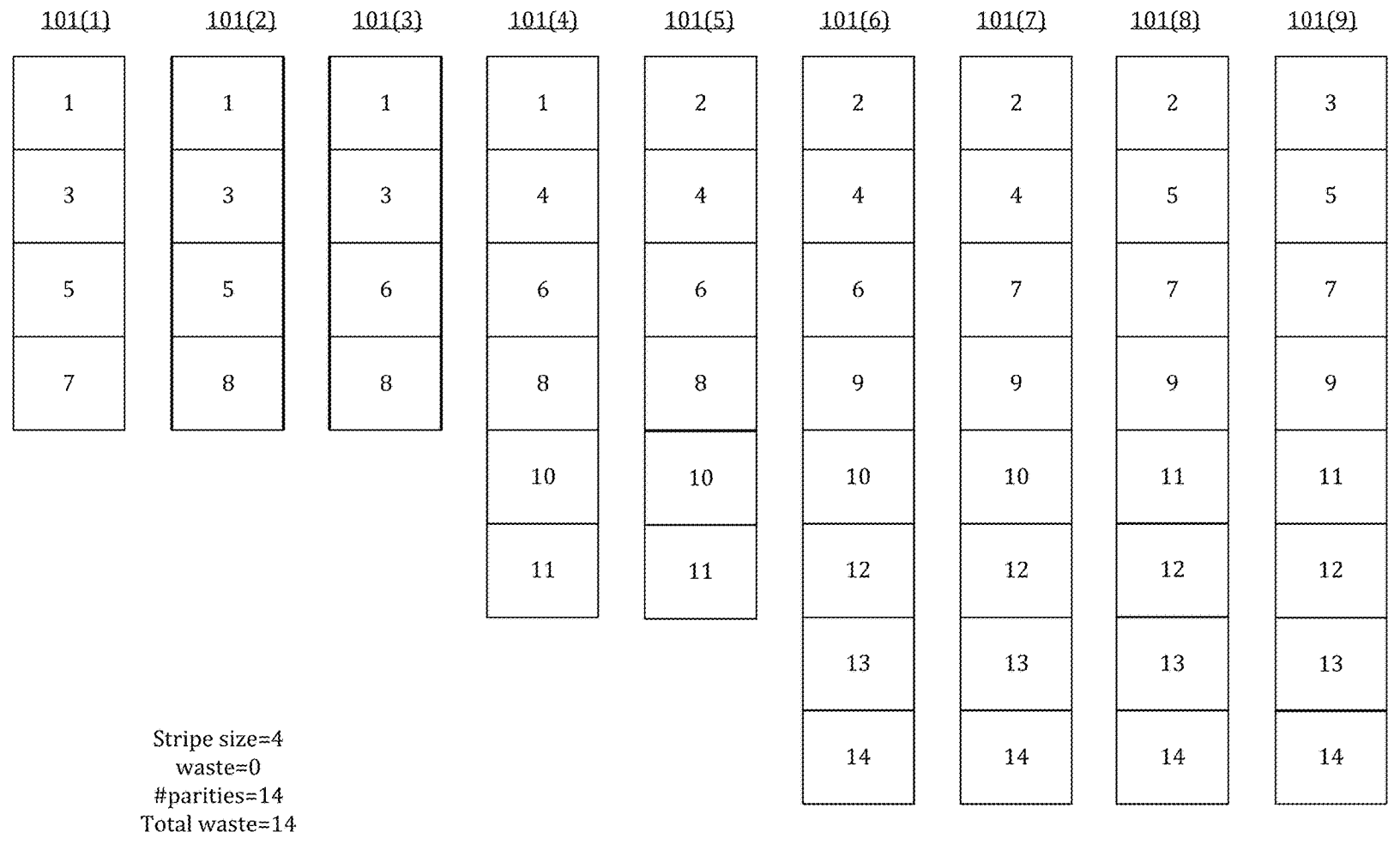

FIG. 1B illustrates an evaluation of a four chunks stripe. Using 4 chunks results 14 stripes, no wasted space, but 14 chunks are dedicated for parities (one per stripe). Total of 14 chunks are not used for user data.

In the same manner, FIG. 1C illustrates an evaluation of a five chunks stripe, resulting 9 stripes with 11 wasted chunks (illustrated as blank rectangles), 9 chunks are dedicated for parities (one per stripe). Total of 20 chunks are not used for user data.

Figure 1D:
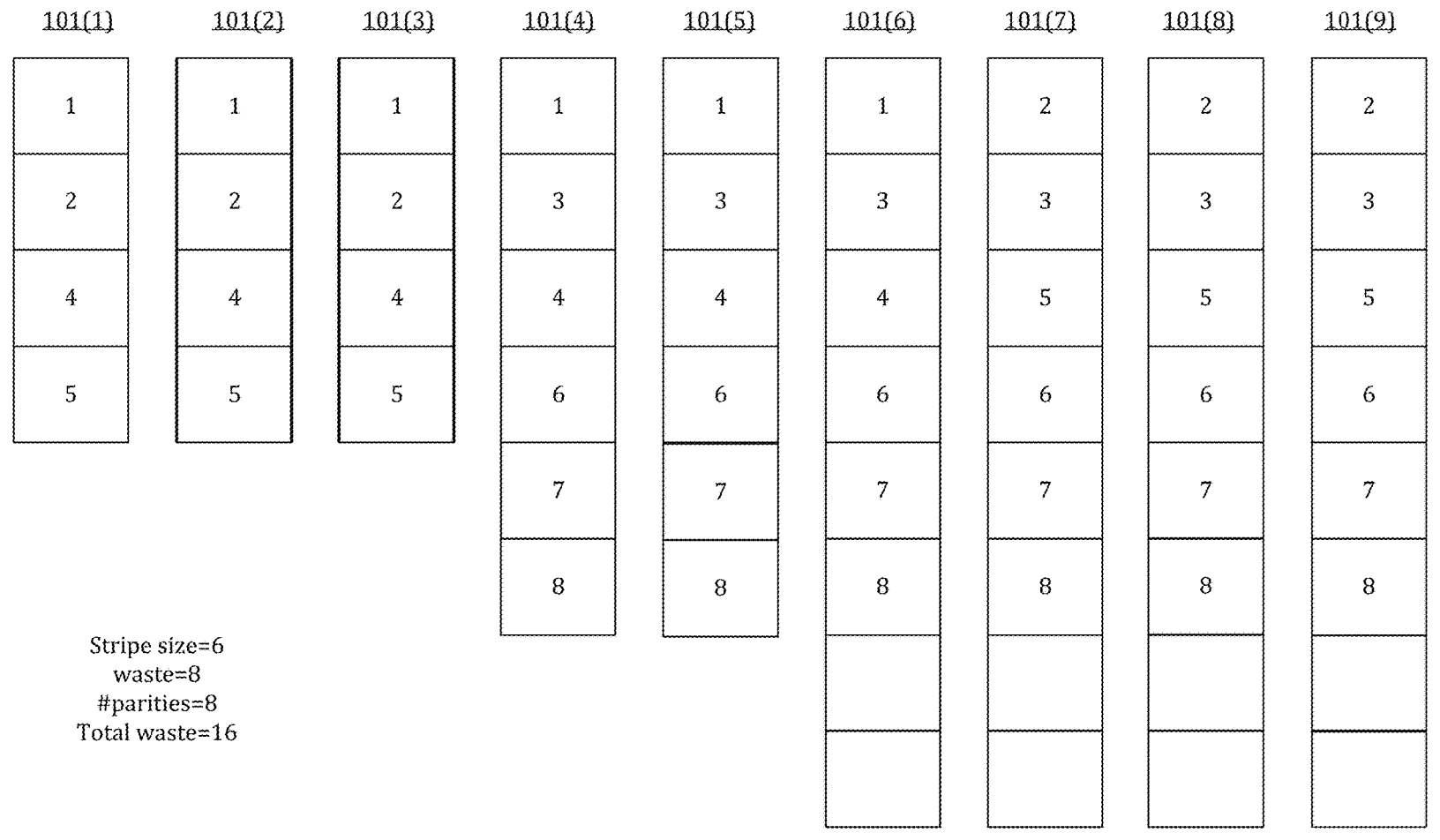

In the same manner, FIG. 1D illustrates an evaluation of a six chunks stripe, resulting 8 stripes with 8 wasted chunks, 8 chunks are dedicated for parities (one per stripe). Total of 16 chunks are not used for user data.

At least in terms of space allocation, a stripe of four chunks, as illustrated in FIG. 1B, results the highest space utilization, and may be preferred when space allocation is the only consideration.

It may also be determined that both the four-chunk stripe of FIG. 1B and the six-chunk stripe of FIG. 1D are above a threshold of desired space utilization, where both cases of space utilization are acceptable, and that the better performing stripe will be chosen. For example, if one of these stripe sizes allows a larger number of parallel writes of stripes, then—this configuration may be preferred.

Performance Evaluation

Other considerations for selecting a stripe configuration includes the performance of writing the stripes. The performance of writing stripes is dictated by: (i) the throughput of the drives, i.e., the writing speed supported by the drives; and (ii) the ability to write in parallel. It is advantageous to have larger stripes, as well as being able to write multiple stripes in parallel, since both will increase the writing throughput of the storage system.

Mixing disks of different writing throughout in the same stripe, may cause the writing time of the stripe to be dictated by the throughput of the slower drives, therefore, the simulation might separate the stripe assignment to groups, each group includes disks of different write throughput, and the assignment of chunks to stripes may be limited to one group at a time.

In addition to stripe size and the corresponding space utilization, the optimal throughput is determined. The maximal throughput is achieved if all the disks are written to in parallel.

Per each stripe size being examined, the number of independent stripes that can be written in parallel is also examined. Independent stripes that can be written in parallel are stripes having chunks from non-overlapping disks.

Simultaneous writing of different stripes with overlapping disks (having chunks from different stripes at the same disk) may be avoided, since writing in parallel to the same disk may cause writing different types of data with different lifespan into the same erase block, which in turn increases the likelihood of different timing eviction of data within the same erase block, and increased write amplification. A disk may store chunks of stripes that are not written in parallel to the storage system.

Figure 2:
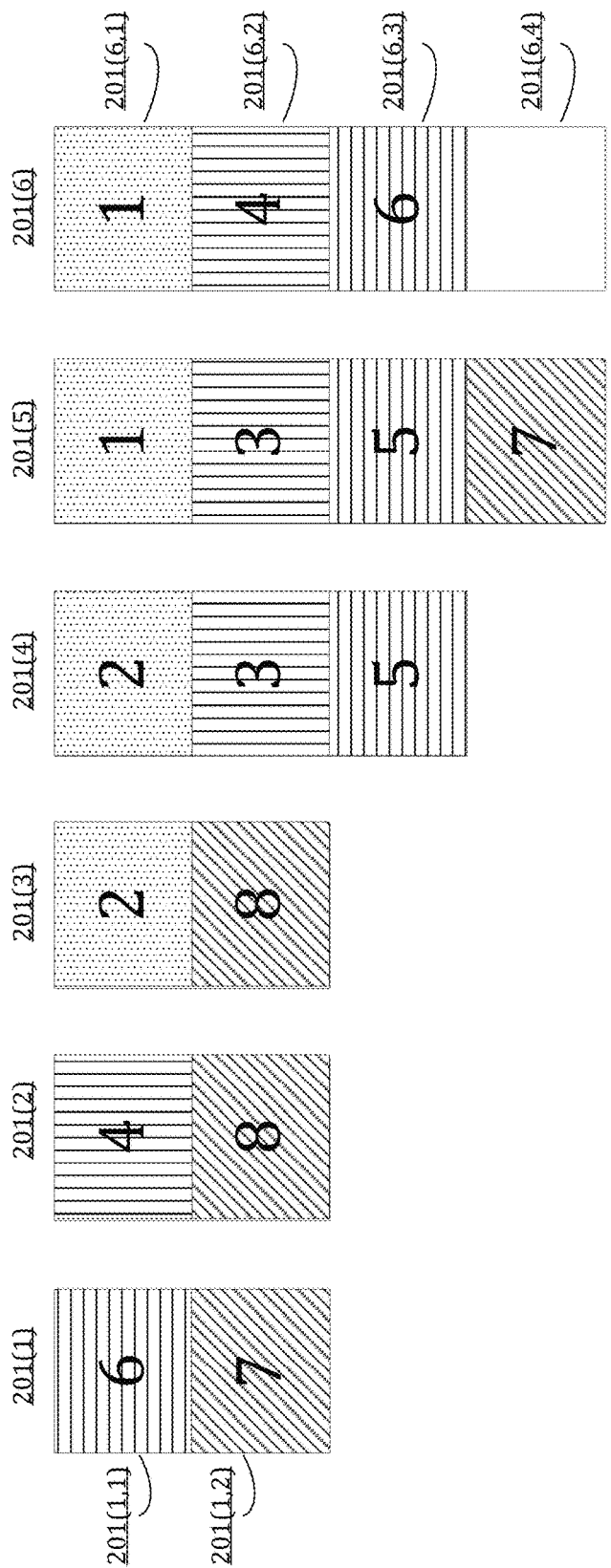
FIG. 2 illustrates an example of disks and chunks of stripes that are allocated in a nonoverlapping manner between the discs.

FIG. 2 illustrate a simple example of a configuration where two stripes can be written in parallel. For the sake of simplicity, stripes of two chunks size are illustrated, across 6 disks 201(1)-201(6), of three different sizes.

In this example: stripes 1 and 2, illustrated with dotted background can be written in parallel, since none of their chunks share the same disk (stripe 1 is composed of chunks from disks 201(5) and 201(6), and stripe 2 is composed of chunks from disks 201(3) and 201(4)). In the same manner, stripes 3 and 4, illustrated with vertical lines can be written in parallel, stripes 5 and 6, illustrated with horizontal lines, can be written in parallel, and stripes 7 and 8, illustrated with diagonal lines, can be written in parallel.

The throughput is calculated according to the number of chunks that can be written in parallel. Suppose all the disks in FIG. 2 have the same write speed of e.g., 100M per second. The number of chunks in a stripe is 2 and the number of parallel stripe writes is 2, therefore the maximum throughput in this configuration is 4×100M=400 M/sec.

For each stripe size that is evaluated, the maximal number of possible parallel stripes is also calculated, as well as the corresponding throughput.

Though the example of FIG. 2 assumes that parallel writing is only of stripes with no disk overlapping, future SSDs may allow parallel writing to different zones (such as ZNS—Zoned Namespace SSD), and the number of zones that can be written in parallel may be taken into considerations, or alternatively, each zone may be regarded as a separate disk, for the sake of calculation.

Though the examples of FIGS. 1A-1D assumes the same size of parity (one chunk) to all examined stripe sizes, the parity size may be adjusted to the stripe size. For example, it may be determined that 2 parities are employed for stripes of up to 80 chunks, 3 parities are employed for stripes of up to 120 chunks, and 4 parities are employed for stripes larger than 120 chunks. The calculation of the space utilization will take into consideration the parity size that was chosen in each iteration of the algorithm.

More than one size of stripes can be chosen by the algorithm. For example, it may be advantageous not to mix disks of different write throughput in the same stripe. The algorithm may be executed separately for each type of disk and result in a different stripe size determination per each disk type. For example, if a first part of the disks has a write throughput that is different from the write throughput of a second part of the disks, the algorithm may suggest a first number of stripes of a first size that are to be written to the disks of the first part, and a second number of stripes of a second size that are to be written to the disks of the second part.

More than one size of stripes can be also chosen in order to achieve a goal of more parallel stripes, in cases where one size of stripes does not achieve the goal of performance, i.e., the number of parallel stripe writes.

Balancing of load among the disks should also be maintained, by simulating the chunk assignment in a Weighted Round Robin manner, such that the amount of unused space that remains in each disk is proportional to the disk size. For example, disks 101(6)-101(9) should have twice of the unused space pf disks 101(1)-101(3).

FIG. 3A illustrates a method 200 for applying striping rules.

Step 210 is for calculating space utilization and write throughput of a storage system, for multiple values of stripe sizes. Step 210 includes multiple iterations for iterating over the various stripe sizes, where each iteration may be executed for one stripe size.

Step 210 may include step 215 of determining the parity size based on the stripe size, where different stripe sizes may be assigned with different parity sizes.

Step 215 is followed by step 220 of simulating assignment of disk's chunks to stripes according to the stripe size, the parity size, the various disk sizes, as illustrated in FIGS. 1A-1D.

Step 220 may include step 222 of evaluating different chunk-to-stripe assignments for determining the assignment that allows a maximum number of parallel stripe writes, as illustrated in FIG. 2.

Step 220 may include step 223 of performing the assignment by using a weighted round robin scheme, according to the disk sizes, so that unused space will be balanced among the disks according to their size.

Step 220 is followed by step 230 of calculating space utilization and write throughput when using the stripe size and the preferred assignment for allowing a maximum number of parallel stripe writes.

When the iterations for all the examined stripe sizes are completed, step 210 is followed by step 240 of defining striping rules by selecting at least one stripe size according to space utilization and write throughput preferences.

Step 210 may be repeated for each group of disks having a similar write throughput. Step 240 may include step 241 of defining a set of striping rules per each group of disks with a similar write throughput. Similar—any similarity criteria may be used—for example difference of throughput of up to 5, 10, 14, 20, 25 percent, and the like. Step 241 may include selecting more than one stripe size when the system includes disks of different write throughput, wherein a stripe size is selected for each group of disks having the same write throughput.

Step 240 is followed by step 250 of writing stripes according to the striping rules that includes one or more stripe size and the number of stripes to be written in parallel. The writing of stripes may be further according to one or more striping rules: the type of disks to be used in each stripe, the assignment of disks per each stripe, and the grouping of stripes to be written in parallel.

Figure 3B:
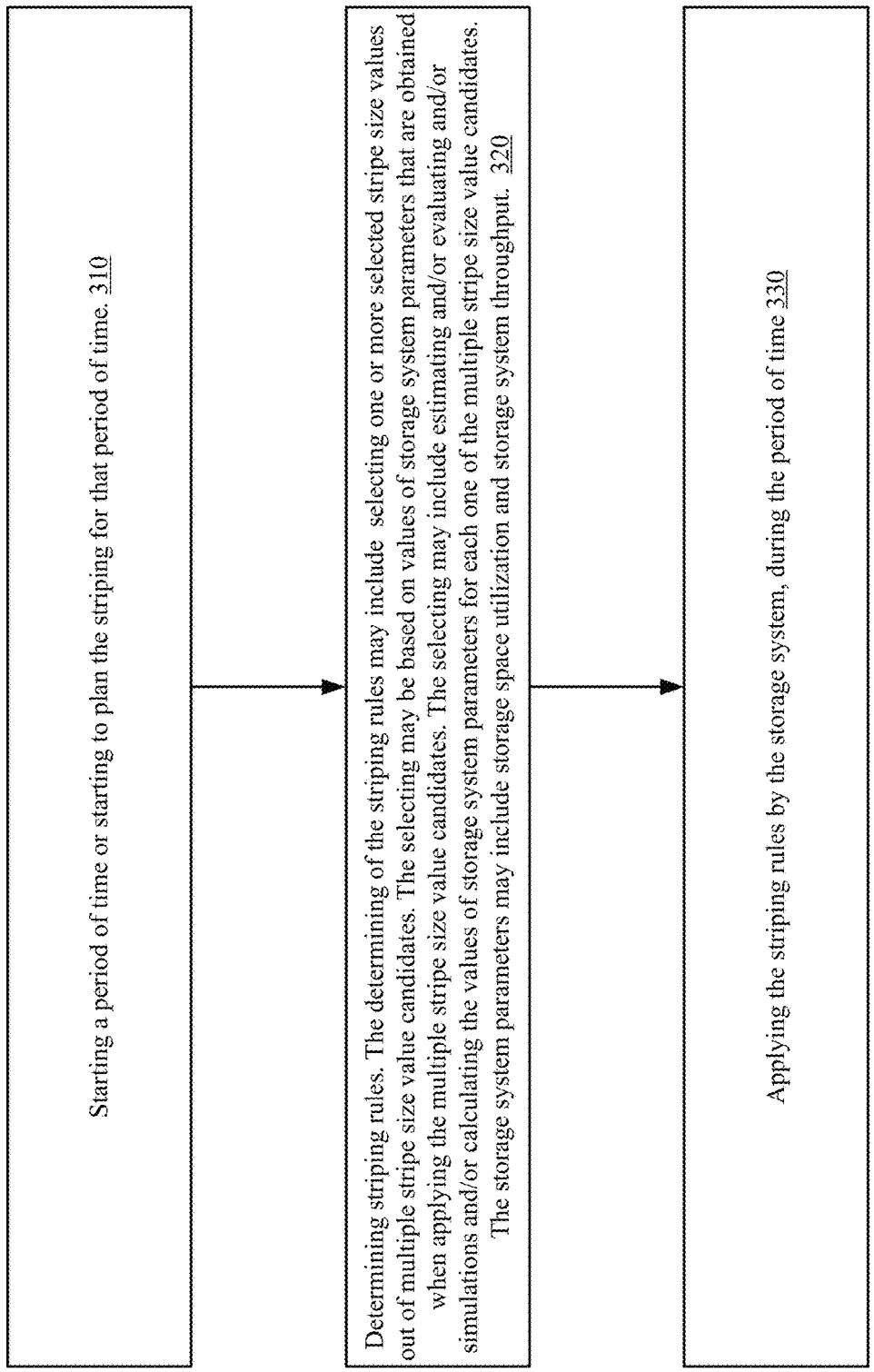
FIG. 3B illustrates an example of a method.

FIG. 3B illustrates a method 300 for striping.

Method 300 executes various steps in a repetitive manner—whereas multiple repetitions are executed during multiple periods of time.

A period of time may initiate and/or terminate as a result of an event, or may have a predetermined start and/or end. The event may be a storage system failure, a change in the number of available storage system disks of the storage system, a failure of storage system disks, an addition of storage system disks, a reduction of storage system disks, changes in the types of storage system disks, and the like.

Method 300 may start by step 310 of starting a period of time or starting to plan the striping for that period of time.

Step 310 may be followed by step 320 of determining striping rules.

The determining of the striping rules may include selecting one or more selected stripe size values out of multiple stripe size value candidates. The stripe size value may refer to the number of chunks to be included in a stripe, or in other words, the number of storage system disks that participate in building the stripe.

The selecting may be based on values of storage system parameters that are obtained when applying the multiple stripe size value candidates. The selecting may include estimating and/or evaluating and/or simulating and/or calculating the values of storage system parameters for each one of the multiple stripe size value candidates.

The storage system parameters may include storage space utilization and storage system throughput. The storage space utilization may refer to the amount of storage space dedicated to user data, i.e., storage space that does not include space dedicated for storing parity chunks, and unused storage space that cannot be used for stripes.

The selecting may be based on a single storage system parameter or on a combination of two or more storage system parameters. Any tradeoff between two of more storage system parameters may be applied.

Step 320 may include at least one of the following:
a. Determining a manner of writing the stripes to the storage system. The manner may include determining which chunks of each stripe will be written to which disk and/or the timing of writing. The disks participating in the building of each stripe. The timing of writing may define the timing relationships between writing chunks of different stripes—for example writing chunks concurrently (in parallel), in a serial manner (writing a certain stripe after another stripe), and the like. The timing of writing may define the timing relationships between writing different stripes, e.g., defining which stripes can be written in parallel.
b. Selecting different stripe size values to different groups of storage system disks that differ from each other by throughput. The difference in throughput may exceed a certain threshold. For example—storage system disks of similar throughput may be allocated the same stripe size. The threshold and/or what is similar may be determined in any manner. Yet for another example—the storage system disks may be virtually clustered or grouped based on their throughput. Storage system disks of a certain group or cluster may be associated with the same stripe size.
c. Determining, for each stripe size value, a size of stripe parity based on the stripe size value.
d. Estimating a set of stripes that are expected to be concurrently written to the storage system, and preventing chunks of different stripes of the set to be written to a same disk.
e. Simulating the applying of the multiple stripe size value candidates. The simulating may include simulating allocation of disks (or chunks) to stripes.
f. Maximizing the storage system throughput.
g. Maximizing the storage space utilization.
h. Reaching a predefined tradeoff between the storage space throughput and the storage space utilization. The predefined tradeoff may define priorities between throughput and space utilization, or weights assigned to throughput and space utilization, for example the throughput may be assigned with a higher weight or lower weight than the weight of the space utilization, so as to reflect different priorities.
i. Determining in response to available storage capacity of the storage system disks. The available capacity may refer to: the capacity reflected by the sizes of the disks, the capacity that is currently not used for storing data, the capacity that excludes failed disks or failed portions within the disks.
j. Allocating chunks per disks while determining unused storage spaces of different storage system disks based on sizes of the different storage system disks.
k. Determining in response to different sizes of different disks of the storage system.

The striping rules may differ from one iteration of the other. Thus, at a certain point of time, the storage system may include stored stripes that comply with different striping rules that were determined on different time periods. This may result, at least in part on the changing status of the storage system—as the determining of step 320 may take into account the current state of the storage system (for example the current number of storage system disks, the current throughput of the storage system disks, current available space of the storage system disks, and any other parameter related to the state of the storage system disks and/or a state of any other component of the storage system).

Step 320 may be followed by step 330 of applying the striping rules by the storage system, during the period of time.

The applying may include obtaining data chunks, converting the data chunks to stripes having at least one of the one or more selected stripe size values, and storing the stripes in the storage system.

When the period of time ends or when the determining of the slicing for another period of time should start—jumping to step 310.

Figure 4A:
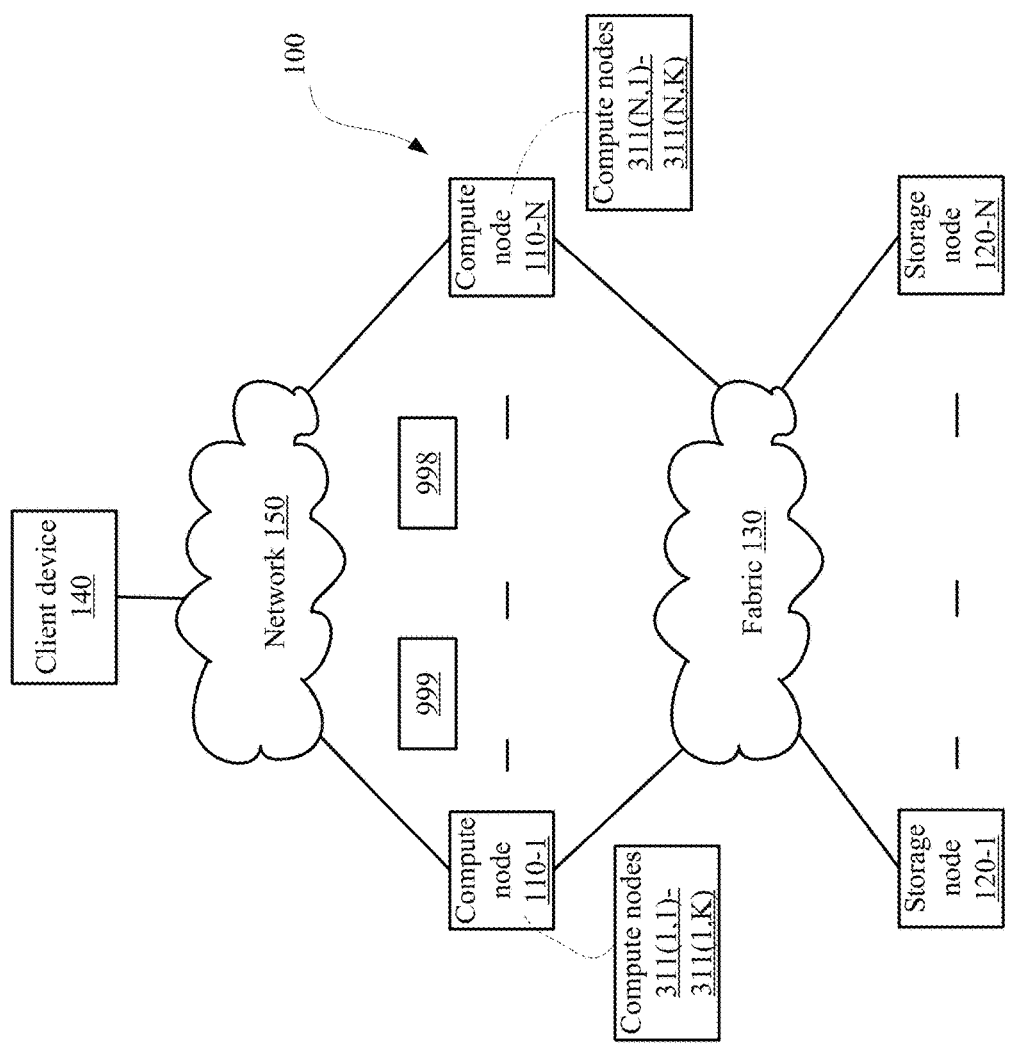
FIG. 4A is an example of a storage system.

FIG. 4A shows an example diagram of a storage system 100 according to the disclosed embodiments.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute nodes 311(1,1)-311(1,K) and compute nodes 311(N,1)-311(N,K).

The storage system 100 also includes a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware. An example arrangement of a compute node 110 is provided in FIG. 4D.

A compute node 110 is configured to perform tasks related to the management of the storage nodes 120. In an embodiment, each compute node 110 interfaces with multiple clients, such as a client device 140, which may be a case insensitive file system client or a case sensitive file system client, via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, etc.), as well as file protocols (e.g., SMB, NFS) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

Storage system 100 and particularly compute nodes 110 implement a multi file protocol environment for supporting the server side of both case insensitive file system and case sensitive file system.

The storage nodes 120 provide the storage and state in the system 100. To this end, each storage node 120 may include a plurality of SSDs which may be relatively inexpensive.

The storage nodes 120 may be configured to have the same capacity as each other or different capacities from each other. In an embodiment, the data stored in each storage node 120 is made redundant internally within the storage node, made redundant at a different storage node, or both. As will be discussed below with reference to FIGS. 4C and 4D, each storage node 120 further includes a non-volatile random-access memory (NVRAM) and an interface module for interfacing with the compute nodes 110.

The storage nodes store the filesystems' data and metadata. At least part of the filesystem metadata may be stored in the NVRAM, for example, the upper layers of the data structures illustrated in FIGS. 4A and 4B may be stored in the NVRAM, while the lower layers of the filesystem metadata, such as the name blocks 240, may be stored in the SSDs.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniB and fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a computer node 110. In such a deployment, the system 100 does not communicate with an external network, e.g., the network 150. It should be further noted that the communication between the compute nodes 110 and the storage nodes 120 is always facilitated over the fabric 130. It should be further noted that the compute nodes 120 can communicate with each other over the fabric 130. The fabric 130 is a shared fabric.

Figure 4C:
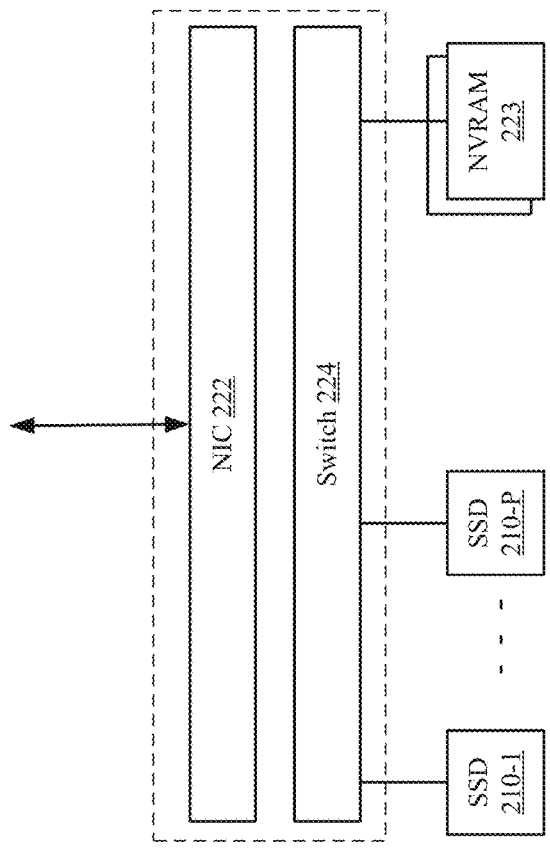
FIG. 4C is an example of an interface module of a storage node.
Figure 4B:
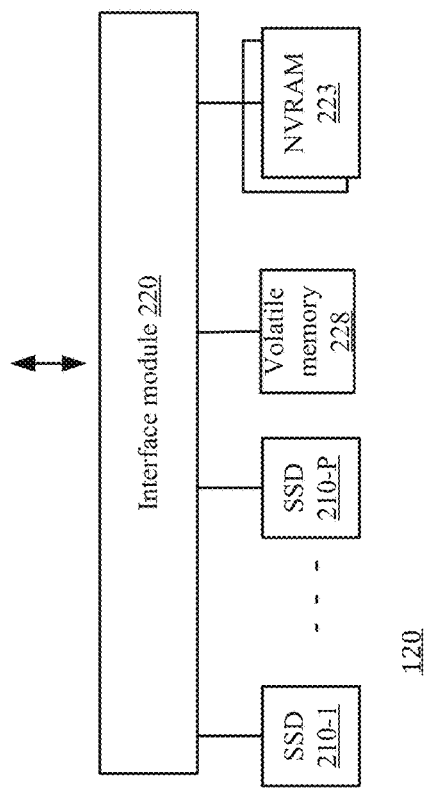
FIG. 4B is an example of a storage node.

FIG. 4B shows an example block diagram illustrating a storage node 120 according to an embodiment. The storage node 120 includes a plurality of storage devices such as SSDs 210-1 through 210-P (hereinafter referred to individually as an SSD 210 and collectively as SSDs 210, merely for simplicity purposes), at least one NVRAM, and an interface module 220.

According to the disclosed embodiments, the NVRAM 223 is utilized to reduce the number of write accesses to the SSDs 210 and the write amplification. According to an embodiment, data is written first to the NVRAM 223, which returns an acknowledgement after each such data write. Then, during a background process, the data is transferred from the NVRAM 223 to the SSDs 210. The data may kept in the NVRAM 223 until the data is completely written to the SSDs 210. Furthermore, this writing procedure ensures no data is lost when power is off.

As the NVRAM 223 supports low write latency and parallel writes, the storage node 120 supports these features. Specifically, the low latency is achieved by acknowledging the write request once the data is saved to the NVRAM 223. The parallel writes are achieved by serving multiple concurrent write requests by the NVRAM 223 and, during the background process, independently fulfilling such requests by saving the data into the SSDs 210.

FIG. 4C shows an example block diagram of an interface module 220. In an example embodiment, an interface module 220 includes a network interface card (NIC) 222 and a switch 224 connected through an internal bus (not shown), e.g., a PCIe bus.

The NIC 222 allows the communication of the storage node 120 with the compute nodes (110, FIG. 4A) over the communication fabric (130, FIG. 4A). The NIC 222 may allow communication via at least one of the protocols discussed above.

The switch 224 allows the connection of the multiple SSDs 210 and NVRAM 223 to and NIC 222. In an example embodiment, the switch 224 is a PCIe switch. In another embodiment, more than one PCIe switch is utilized to support more connectivity to the SSDs. In some configurations, where non PCIe SSDs 210 are available (e.g., Ethernet SSDs), the switch 224 may be a non PCIe switch, for example an Ethernet switch.

Figure 4D:
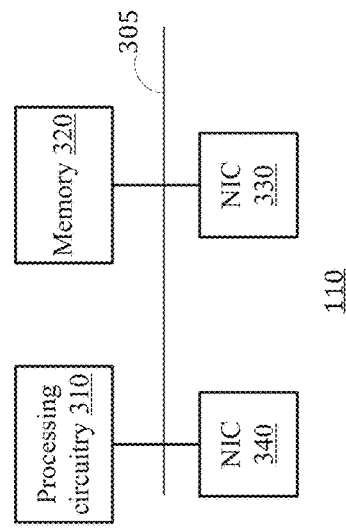
FIG. 4D is an example of a compute node.

FIG. 4D shows an example block diagram illustrating a compute node 110 according to an embodiment. The compute node 110 includes a processing circuitry 310, a memory 320, a first network interface controller (NIC) 330 and a second NIC 340. In an embodiment, the components of the compute node 110 may be communicatively connected via a bus 305.

The processing circuitry 310 may be realized as one or more hardware logic components and circuits. For example, and without limitation, illustrative types of hardware logic components that can be used include a field programmable gate array (FPGA), an Application Specific Integrated Circuit (ASIC), an Application Specific Standard Product (ASSP), a System On Chip (SOC), a general-purpose microprocessor, a microcontroller, a Digital Signal Processor (DSP), a neural network processor, and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions or software to implement one or more processes performed by compute node 110 may be stored in the memory 320. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The first NIC 330 allows the compute node 110 to communicate with the storage nodes via the communication fabric 130 (see FIG. 4A) to provide remote direct memory access to data stored in the storage nodes. In an embodiment, the first NIC 130 may enable communication via RDMA protocols such as, but not limited to, InfiniB and, RDMA over Converged Ethernet (RoCE), iWARP, and the like.

The second NIC 340 allows the compute node 110 to communicate with client devices (e.g., client device 140, FIG. 4A) through a communication network (e.g., the network 150, FIG. 4A). Examples for such a network includes, but is not limited to, the Internet, the world-wide-web (WWW), a local area network (LAN), a wide area network (WAN), and the like. It should be appreciated that in some configurations, the compute node 110 may include a single NIC. This configuration is applicable when, for example, the fabric is shared.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for striping, the method comprises:
  performing, for each period of time out of multiple periods of time, the steps of:
    simulating an assignment of disk chunks to stripes, wherein the simulating is iterated for each stripe size value candidate of multiple stripe size value candidates, wherein each iteration provides a set of values of storage system parameters according to the assignment;
    determining striping rules; wherein the determining of the striping rules comprises: selecting one or more selected stripe size values out of the multiple stripe size value candidates, wherein different stripe size value candidates indicate different numbers of disks participating in a stripe; wherein the selecting is based on sets of values of the storage system parameters that are provided by the simulating, and according to priorities between a storage system throughput and a storage space utilization; wherein the storage system parameters comprise the storage space utilization and the storage system throughput; wherein a certain value of the storage space utilization is based on the amount of space available for striping if using a certain stripe size value candidate of the multiple stripe size value candidates; wherein a certain value of the storage system throughput is based on the number of stripes that can be written in parallel if using the certain stripe size value candidate; and
    applying the striping rules by the storage system, during the period of time; wherein the applying comprises obtaining data chunks; converting the data chunks to stripes having at least one of the one or more selected stripe size values; and storing the stripes in the storage system.

2. The method according to claim 1 wherein the determining of the striping rules comprises determining a manner of writing the stripes to the storage system.

3. The method according to claim 1 wherein the determining of the striping rules comprises determining a manner of parallelizing a writing of the stripes to the storage system.

4. The method according to claim 1 comprising selecting different stripe size values to different groups of storage system disks that differ from each other by throughput.

5. The method according to claim 1 wherein the determining of the striping rules comprises determining, for each stripe size value, a size of stripe parity based on the stripe size value.

6. The method according to claim 1 wherein the determining of the striping rules comprises estimating a set of stripes that are expected to be concurrently written to the storage system, and preventing chunks of different stripes of the set to be written to a same disk.

7. The method according to claim 1 wherein the selecting comprises maximizing the storage system throughput.

8. The method according to claim 1 wherein the selecting comprises maximizing the storage space utilization.

9. The method according to claim 1 wherein the selecting comprises reaching a predefined tradeoff between the storage space throughput and the storage space utilization.

10. The method according to claim 1 wherein a duration of at least one of the multiple periods of time is predetermined.

11. The method according to claim 1 wherein at least one of the multiple periods of time ends due to a change in a number of disks of the storage system.

12. The method according to claim 1 wherein at least one of the multiple periods of time ends due to a failure of one or more storage system disks.

13. The method according to claim 1 wherein the determining of the striping rules is responsive to available storage capacity of the storage system disks.

14. The method according to claim 1 wherein the determining of the striping rules comprises allocating chunks per disks while determining unused storage spaces of different storage system disks based on sizes of the different storage system disks.

15. The method according to claim 1 wherein the determining of the striping rules is responsive to different sizes of different disks of the storage system.

16. A non-transitory computer readable medium for striping, the non-transitory computer readable medium stores instructions for:
- performing, for each period of time out of multiple periods of time, the steps of:
  - simulating an assignment of disk chunks to stripes, wherein the simulating is iterated for each stripe size value candidate of multiple stripe size value candidates, wherein each iteration provides a set of values of storage system parameters according to the assignment;
  - determining striping rules; wherein the determining of the striping rules comprises selecting one or more selected stripe size values out of the multiple stripe size value candidates, wherein different stripe size value candidates indicate different numbers of disks participating in a stripe; wherein the selecting is based on sets of values of the storage system parameters that are provided by the simulating, and according to priorities between a storage system throughput and a storage space utilization; wherein the storage system parameters comprise the storage space utilization and the storage system throughput; wherein a certain value of the storage space utilization is based on the amount of space available for striping if using a certain stripe size value candidate of the multiple stripe size value candidates; wherein a certain value of the storage system throughput is based on the number of stripes that can be written in parallel if using the certain stripe size value candidate; and
  - applying the striping rules by the storage system, during the period of time; wherein the applying comprises obtaining data chunks; converting the data chunks to stripes having at least one of the one or more selected stripe size values; and storing the stripes in the storage system.

17. A storage system comprising multiple disks and at least one processing circuitry that is configured to perform, for each period of time out of multiple periods of time, the steps of:
- simulating an assignment of disk chunks to stripes, wherein the simulating is iterated for each stripe size value candidate of multiple stripe size value candidates, wherein each itteration provides a set of values of storage system parameters according to the assignment;
- determining striping rules; wherein the determining of the striping rules comprises selecting one or more selected stripe size values out of the multiple stripe size value candidates, wherein different stripe size value candidates indicates different numbers of disks participating in a stripe; wherein the selecting is based on sets of values of the storage system parameters that are provided by the simulating, and according to priorities between a storage system throughput and a storage space utilization; wherein the storage system parameters comprise the storage space utilization and the storage system throughput; wherein a certain value of the storage space utilization is based on the amount of space available for striping if using a certain stripe size value candidate of the multiple stripe size value candidates; wherein a certain value of the storage system throughput is based on the number of stripes that can be written in parallel if using the certain stripe size value candidate;
- applying the striping rules by the storage system, during the period of time; wherein the applying comprises obtaining data chunks; converting the data chunks to stripes having at least one of the one or more selected stripe size values; and storing the stripes in the storage system.

* * * * *